United States Patent
Albrecht

(10) Patent No.: US 10,341,173 B2
(45) Date of Patent: Jul. 2, 2019

(54) METHOD FOR CONFIGURING A COMMUNICATION DEVICE WITHIN AN INDUSTRIAL AUTOMATION SYSTEM AND DISTRIBUTION UNIT FOR A CONFIGURATION SERVER OF THE INDUSTRIAL COMMUNICATION NETWORK

(71) Applicant: Siemens Aktiengesellschaft, Munich (DE)

(72) Inventor: Harald Albrecht, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 603 days.

(21) Appl. No.: 14/697,162

(22) Filed: Apr. 27, 2015

(65) Prior Publication Data
US 2015/0312096 A1    Oct. 29, 2015

(30) Foreign Application Priority Data
Apr. 28, 2014   (EP) ..................................... 14166194

(51) Int. Cl.
*G06F 15/177*    (2006.01)
*H04L 12/24*     (2006.01)
(Continued)

(52) U.S. Cl.
CPC .......... *H04L 41/0803* (2013.01); *H04L 12/12* (2013.01); *H04L 61/2015* (2013.01);
(Continued)

(58) Field of Classification Search
CPC ..................... H04L 41/0803; H04L 61/2015
(Continued)

(56) References Cited

U.S. PATENT DOCUMENTS

| | | | | |
|---|---|---|---|---|
| 5,805,805 A | * | 9/1998 | Civanlar | H04L 12/4608 370/409 |
| 6,212,559 B1 | * | 4/2001 | Bixler | H04L 41/082 709/220 |

(Continued)

FOREIGN PATENT DOCUMENTS

| | | |
|---|---|---|
| CN | 1861317 | 11/2006 |
| CN | 101027616 | 8/2007 |

(Continued)

*Primary Examiner* — Vivek Srivastava
*Assistant Examiner* — Atta Khan
(74) *Attorney, Agent, or Firm* — Cozen O'Connor

(57) ABSTRACT

A configuration unit of a communication device which communicates a datagram with a configuration request to a configuration server in order to configure a communication device within an industrial automation system, wherein the configuration server allocates to the communication device, in response to the configuration request, at least one first topological device name component assigned to a spatial or hierarchical arrangement of the configuration server, each forwarding distribution unit adds a further topological device name component assigned to a spatial or hierarchical arrangement of the respective forwarding distribution unit, and the configuration unit of the communication device generates the device name thereof from the topological device name components and a name component that is unique within the subnetwork of the device.

15 Claims, 4 Drawing Sheets

(51) Int. Cl.
*H04L 29/12* (2006.01)
*H04L 12/12* (2006.01)

(52) U.S. Cl.
CPC ........ *H04L 61/305* (2013.01); *H04L 61/6059* (2013.01); *H04L 61/6063* (2013.01); *Y02D 50/40* (2018.01)

(58) Field of Classification Search
USPC ........................................................ 709/220
See application file for complete search history.

(56) References Cited

U.S. PATENT DOCUMENTS

| | | | | |
|---|---|---|---|---|
| 6,587,874 | B1* | 7/2003 | Golla | H04L 41/08 707/999.1 |
| 6,721,880 | B1* | 4/2004 | Pike | H04L 29/06 709/220 |
| 7,218,995 | B2 | 5/2007 | Jahn et al. | |
| 7,869,899 | B2 | 1/2011 | Hammond et al. | |
| 8,880,664 | B1* | 11/2014 | Tekle | H04L 41/0803 709/223 |
| 2005/0041671 | A1 | 2/2005 | Ideda et al. | |
| 2006/0159100 | A1* | 7/2006 | Droms | H04L 12/2801 370/395.2 |
| 2007/0156861 | A1* | 7/2007 | Nedelcu | H04L 41/12 709/220 |
| 2008/0025299 | A1* | 1/2008 | Agarwal | H04L 29/1282 370/389 |
| 2008/0028437 | A1* | 1/2008 | Zeng | H04L 63/08 726/2 |
| 2008/0052505 | A1 | 2/2008 | Theobald | |
| 2009/0048699 | A1 | 2/2009 | Jahn | |
| 2010/0111081 | A1 | 5/2010 | Diab | |
| 2012/0113863 | A1 | 5/2012 | Vasseur et al. | |
| 2012/0207018 | A1 | 8/2012 | Goldenberg et al. | |
| 2013/0111499 | A1* | 5/2013 | Dixon | G06F 13/00 719/314 |
| 2016/0212223 | A1* | 7/2016 | Yang | H04L 61/2015 |

FOREIGN PATENT DOCUMENTS

| | | |
|---|---|---|
| CN | 101356417 | 1/2009 |
| DE | 102011088161 A1 | 6/2013 |
| WO | WO 2006/024844 | 3/2006 |
| WO | WO 2007/087922 | 8/2007 |

* cited by examiner

METHOD FOR CONFIGURING A COMMUNICATION DEVICE WITHIN AN INDUSTRIAL AUTOMATION SYSTEM AND DISTRIBUTION UNIT FOR A CONFIGURATION SERVER OF THE INDUSTRIAL COMMUNICATION NETWORK

BACKGROUND OF THE INVENTION

1. Field of the Invention

The present invention relates to industrial automation systems and, more particularly, to a method for configuring a communication device within an industrial automation system and distribution unit for a configuration server of the industrial communication network.

2. Description of the Related Art

Industrial automation systems are used to monitor, control and regulate technical processes, in particular in the field of production, process and building automation, and enable operation of control devices, sensors, machines and industrial installations, which is intended to be performed as autonomously as possible and independently of human interventions. On account of continuously increasing importance of information technology for automation systems which comprise numerous networked control and computer units, methods for reliably providing functions that are distributed over an automation system and are intended to provide monitoring, control and regulation functions are becoming increasingly important.

Interruptions in communication connections between computer units of an industrial automation system or automation devices may result in undesirable or unnecessary repetition of a communication of a service request. This repetition causes additional utilization of communication connections of the industrial automation system, which may result in further system disturbances or faults. In addition, messages that have not been communicated or have not been fully communicated may prevent an industrial automation system from changing to or remaining in a safe operating state, for example. This may ultimately result in failure of an entire production installation and a costly production outage. A particular problem in industrial automation systems regularly results from message traffic having a comparatively large number of messages but relatively short messages, as a result of which the above problems are intensified.

U.S. 2005/0041671 A1 discloses a communication system having at least one first and one second router, where the second router requests at least one IPv6 address prefix from the first router. In this case, the first router comprises a storage unit for IPv6 address prefixes, of which at least one IPv6 address prefix is disclosed in response to the request from the second router. The second router comprises a unit for generating a further IPv6 address prefix based on the IPv6 address prefix disclosed by the first router. The further IPv6 address prefix is used by a communication device connected to the second router to generate an IPv6 address and is disclosed by the second router for this purpose.

DE 10 2011 088161 A1 discloses a method for operating an IPv6 communication network, where a respective communication device is assigned location information that is inserted into a communication network address assigned to that communication device. This can be implemented based on DHCPv6, for example. Using communication network addresses comprising location information, communication devices can be localized and locally driven with low complexity.

SUMMARY OF THE INVENTION

It is therefore an object of the present invention to provide a method for configuring an IPv6 communication device with an automated allocation of a topological and/or hierarchical device name and to provide a corresponding communication device.

These and other objects and advantages are achieved in accordance with the invention via a method and communication device within an industrial automation system, wherein a configuration unit of the communication device, upon start-up of the communication device, communicates a datagram with a configuration request to a configuration server. The configuration unit is a DHCPv6 client (Dynamic Host Configuration Protocol), for example, while the configuration server is preferably a DHCPv6 server. The datagram with the configuration request is forwarded to the configuration server when communicated via at least one subnetwork-specific distribution unit. The subnetwork-specific distribution unit is preferably a DHCPv6 relay.

In accordance with the invention, the configuration server allocates to the communication device in response to the configuration request at least one first topological device name component assigned to a spatial or hierarchical arrangement of the configuration server. Each forwarding distribution unit adds a further topological device name component assigned to a spatial or hierarchical arrangement of the respective forwarding distribution unit. Furthermore, the configuration server creates configuration information comprising at least the first device name component and communicates a datagram with the configuration information to the communication device to be configured. The datagram with the configuration information is forwarded to the communication device when communicated via the at least one subnetwork-specific distribution unit. The configuration unit of the communication device generates the device name thereof from the topological device name components and a name component that is unique within the subnetwork of the device.

The method in accordance with the invention can be employed in Ethernet communication networks without IP subnetwork formation. In particular, in this case there is no need for any IP routers for forming domain boundaries. This reduces costs for corresponding communication devices and simplifies both configuration and address planning. Furthermore, the method in accordance with the invention enables a significant reduction in overhead for prior configuration and start-up of series production machines because error-susceptible individual project planning for devices to be started up can be dispensed with.

In accordance with one advantageous embodiment of the method of the invention, the configuration request is supplemented by the respective further topological device name component when communicated to the configuration server by each forwarding distribution unit. Here, the configuration server preferably allocates all topological device name components to the communication device. Furthermore, the configuration information created by the configuration server advantageously comprises all topological device name components.

In accordance with an alternative advantageous embodiment of the present invention, the configuration information is supplemented by the respective further topological device name component in the course of its communication to the communication device by each forwarding distribution unit.

Here, the configuration server preferably allocates only one first topological device name component to the communication device.

In accordance with one preferred embodiment of the method of the invention, the configuration server electronically signs the configuration information with an electronic key assigned to the configuration server. A corresponding signature of the configuration information can thus be verified by the communication device to be configured before the configuration information is accepted. This results in explicit safeguarding of a communication relation between configuration server and communication device to be configured. Communication relations between configuration server and distribution units are preferably safeguarded at least implicitly in the context of a start-up of the distribution units.

The configuration unit communicates the datagram with the configuration request preferably as a multicast message. Furthermore, the configuration server can be assigned to a plurality of subnetworks. Here, the configuration unit communicates the datagram with the configuration request as a multicast message advantageously to a distribution unit within the subnetwork of the communication device. The distribution unit assigned to the subnetwork of the communication device forwards the datagram with the configuration request preferably as a unicast message to the configuration server.

In accordance with another preferred embodiment of the method of the invention, the configuration request of the communication device to be configured comprises a manufacturer-specific option, by which an allocation of a device name with at least one topological and/or hierarchical device name component is requested. Furthermore, the configuration server and/or each forwarding distribution unit add(s) to the datagram with the configuration information for the communication device in each case a manufacturer-specific option which designates a spatial or hierarchical arrangement of the configuration server and/or of the respective forwarding distribution unit. This enables a simple realization of the method in accordance with the invention, in particular in already existing communication networks.

It is also an object of the invention to provide a distribution unit for a configuration server of an industrial communication network for performing the method in accordance with the above-disclosed embodiments. Here, the distribution unit is configured to forward datagrams with a respective configuration request of a communication device to a configuration server. In addition, the distribution unit is configured to forward datagrams with respective configuration information of the configuration server to a respective communication device. Furthermore, the distribution unit is further configured such that the configuration information is supplemented by a topological device name component assigned to a spatial or hierarchical arrangement of the distribution unit.

In accordance with one advantageous embodiment of the present invention, the distribution unit can be integrated as a DHCPv6 relay into a router that connects two subnetworks to one another. As an alternative thereto, the distribution unit can be integrated as a DHCPv6 lightweight relay into a switch. In this case, the distribution unit is embodied and designed to the effect that datagrams with configuration requests are processed before a switch operation by the DHCPv6 lightweight relay.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in greater detail below on the basis of one exemplary embodiment with reference to the drawing, in which.

DETAILED DESCRIPTION OF THE EXEMPLARY EMBODIMENTS

Figure 1:
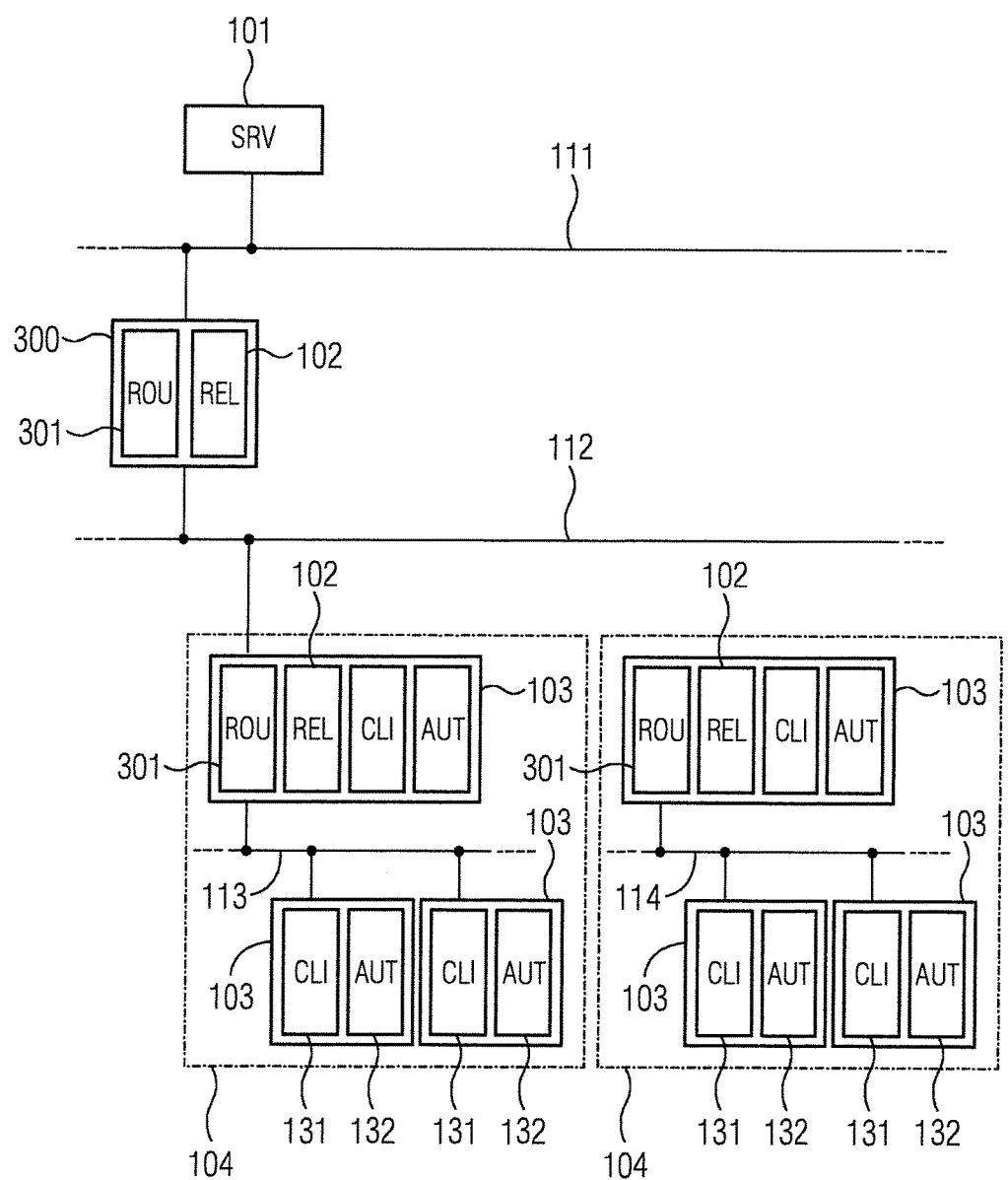
FIG. 1 shows a schematic illustration of an industrial automation system having a DHCPv6 server, a plurality of subnetworks with assigned DHCPv6 relays and a plurality of automation devices to be configured with DHCPv6 clients in accordance with the invention.

The industrial automation system illustrated schematically in FIG. 1 comprises a DHCPv6 server 101 as configuration server, a plurality of subnetworks 111-114 with assigned DHCPv6 relays 102 as subnetwork-specific distribution units, and a plurality of modular automation devices 103 to be configured. The automation devices 103 are, for example, programmable logic controllers of a complex machine 104 and each comprise a communication module having a DHCPv6 client 131 and an automation module 132. The automation modules 132 in turn each comprise at least one central unit and an input/output unit. The input/output units are used to exchange control and measurement variables between the respective automation device 103 and a machine or apparatus controlled by the automation device 103. The central units of the automation modules 132 are provided in particular for determining suitable control variables from detected measurement variables. In the present exemplary embodiment, the above components of the automation devices 103 are connected to one another via a backplane bus system.

Figure 2:
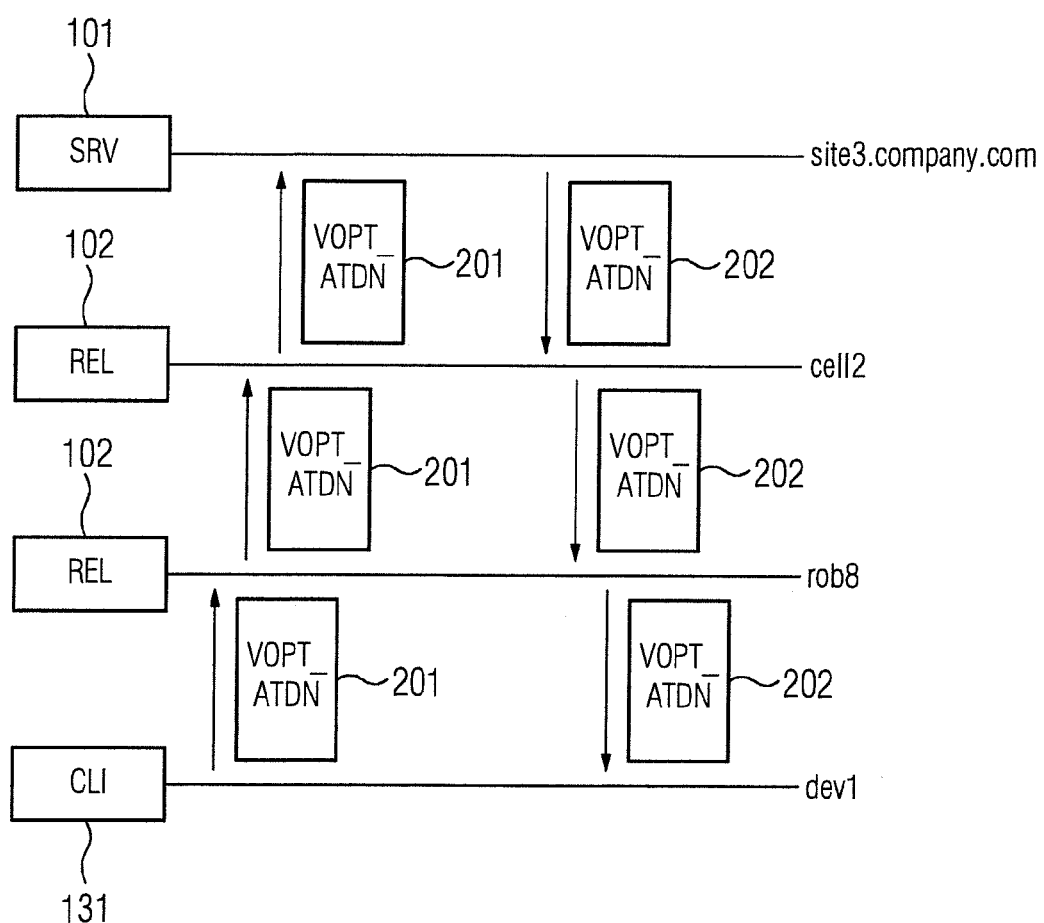
FIG. 2 shows a schematic illustration of a data exchange between a DHCPv6 server and a DHCPv6 client to be configured via a plurality of DHCPv6 relays in accordance with the invention.

Via the communication modules, the automation devices 103 are each connected to a subnetwork 113, 114 with further automation devices 103. In accordance with FIG. 2, a DHCPv6 client 131 as a configuration unit of a communication module, upon start-up, communicates a datagram 201 with a configuration request to the DHCPv6 server 101. The DHCPv6 client 131 communicates the datagram 201 with the configuration request as a multicast message to a DHCPv6 relay 102 within the subnetwork 113, 114 of the respective communication module. The DHCPv6 relay 102 forwards the datagram 201 with the configuration request in the present exemplary embodiment as a unicast message via a further DHCPv6 relay 102 to the DHCPv6 server 101. DHCPv6 relays can in principle also communicate by multicast with a superordinate DHCPv6 server; in the present exemplary embodiment, a communication by unicast is preset. The configuration request of the communication module comprises a manufacturer-specific option VOPT_ATDN, by which an allocation of a device name with at least one topological and/or hierarchical device name component is requested.

The DHCPv6 server 101 allocates to the communication module in response to the configuration request at least one first topological device name component assigned to a spatial or hierarchical arrangement of the DHCPv6 server 101. In the present exemplary embodiment, the first device name component is "site3.company.com". Each forwarding DHCPv6 relay 102 adds a further topological device name component assigned to a spatial or hierarchical arrangement of the respective forwarding DHCPv6 relay 102. This can occur both during forwarding of a configuration request and during forwarding of configuration information.

After allocation of the first topological device name component, the DHCPv6 server 101 creates configuration information comprising at least the first device name component and communicates a datagram 202 with the configuration information to the communication module. The configuration information is electronically signed by the DHCPv6 server 101 with an electronic key assigned to the DHCPv6 server 101. Thus, the configuration information can be verified later by the respective DHCPv6 client 131 before the configuration information is accepted, and can be rejected as invalid, if appropriate.

The datagram 202 with the configuration information is forwarded to the communication module when communicated once again via the DHCPv6 relays 102. The DHCPv6 server 101 and each forwarding DHCPv6 relay 102 each add to the datagram 202 with the configuration information a manufacturer-specific option VOPT_ATDN designating a spatial or hierarchical arrangement of the DHCPv6 server 101 and of the respective forwarding DHCPv6 relay 102. Here, corresponding spatial or hierarchical indications, "cell2" and "rob8" in the present exemplary embodiment, are optionally added to an already existing option VOPT_ATDN or are attached as further options VOPT_ATDN.

The DHCPv6 client 131 of the communication module to be configured generates the device name of the communication module from the topological device name components and a name component that is unique within the subnetwork 113, 114 of the module. The DHCPv6 client evaluates the manufacturer-specific option VOPT_ATDN for this purpose.

The DHCPv6 relays 102 are configured for performing the above-described method, in particular for forwarding datagrams with configuration requests initiated by DHCPv6 clients 131 to the DHCPv6 server 101. In the opposite direction, the DHCPv6 relays 102 are configured for forwarding datagrams with configuration information of the DHCPv6 server 101 to the DHCPv6 clients 131.

Furthermore, the DHCPv6 relays 102 are configured such that the configuration information is supplemented by a topological device name component assigned to a spatial or hierarchical arrangement of the respective DHCPv6 relay 102. This can be performed in two ways, in principle. In accordance with a first embodiment, the configuration request is supplemented by the respective further topological device name component when communicated from the respective DHCPv6 client 131 to the DHCPv6 server 101 by each forwarding DHCPv6 relay. Here, the DHCPv6 server 101 allocates all topological device name components to the respective DHCPv6 client 131. The configuration information created by the DHCPv6 server 101 therefore comprises all topological device name components which are thus comprised by an electronic signature of the configuration information. In a second embodiment, the configuration information is supplemented by the respective further topological configuration information when communicated from the DHCPv6 server 101 to the respective DHCPv6 client 131 by each forwarding DHCPv6 relay 102. Here, the DHCPv6 server 101 allocates only one first topological device name component to the respective DHCPv6 client.

Figure 3:
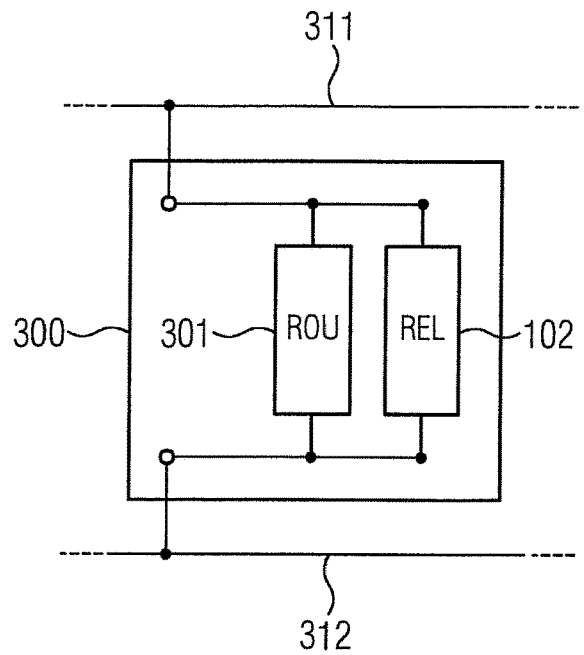
FIG. 3 shows a schematic illustration of a DHCPv6 relay integrated into a router in accordance with the invention.
Figure 4:
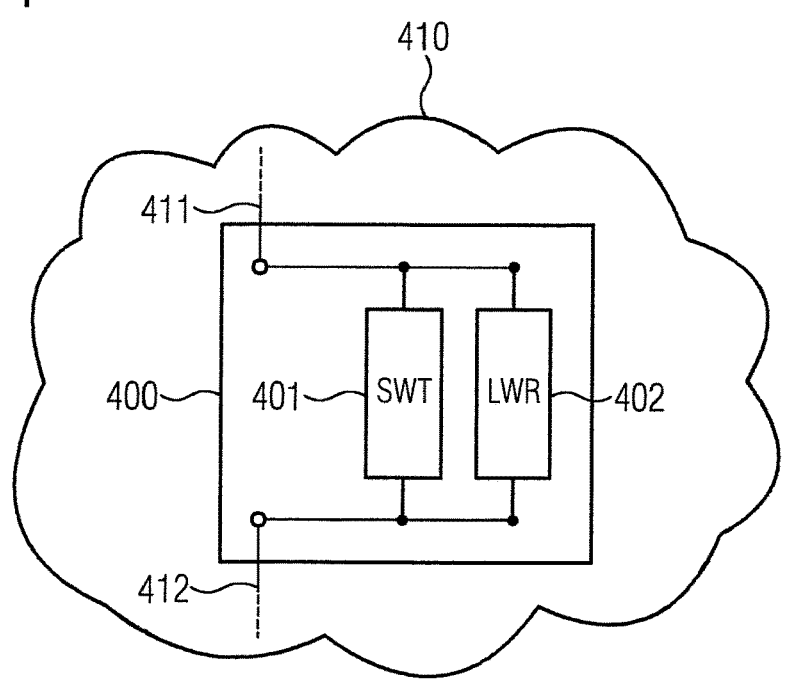
FIG. 4 shows a schematic illustration of a DHCPv6 relay integrated into a switch.

FIG. 3 shows an embodiment in which a DHCPv6 relay 102 is integrated into a router 300 which connects two subnetworks 311, 312 to one another and which comprises, besides the DHCPv6 relay 102, a routing module 301 connected to both subnetworks 311, 312 in parallel with the relay. In accordance with FIG. 4, a DHCPv6 lightweight relay 402 can be integrated into a switch 400. The switch 400 additionally comprises at least two link ports 411, 412 and a switch module 401 for data communication within a subnetwork 400. Here, the DHCPv6 lightweight relay 402 is configured such to the effect that datagrams with configuration requests are processed before a switch operation by the DHCPv6 lightweight relay 402.

Figure 5:
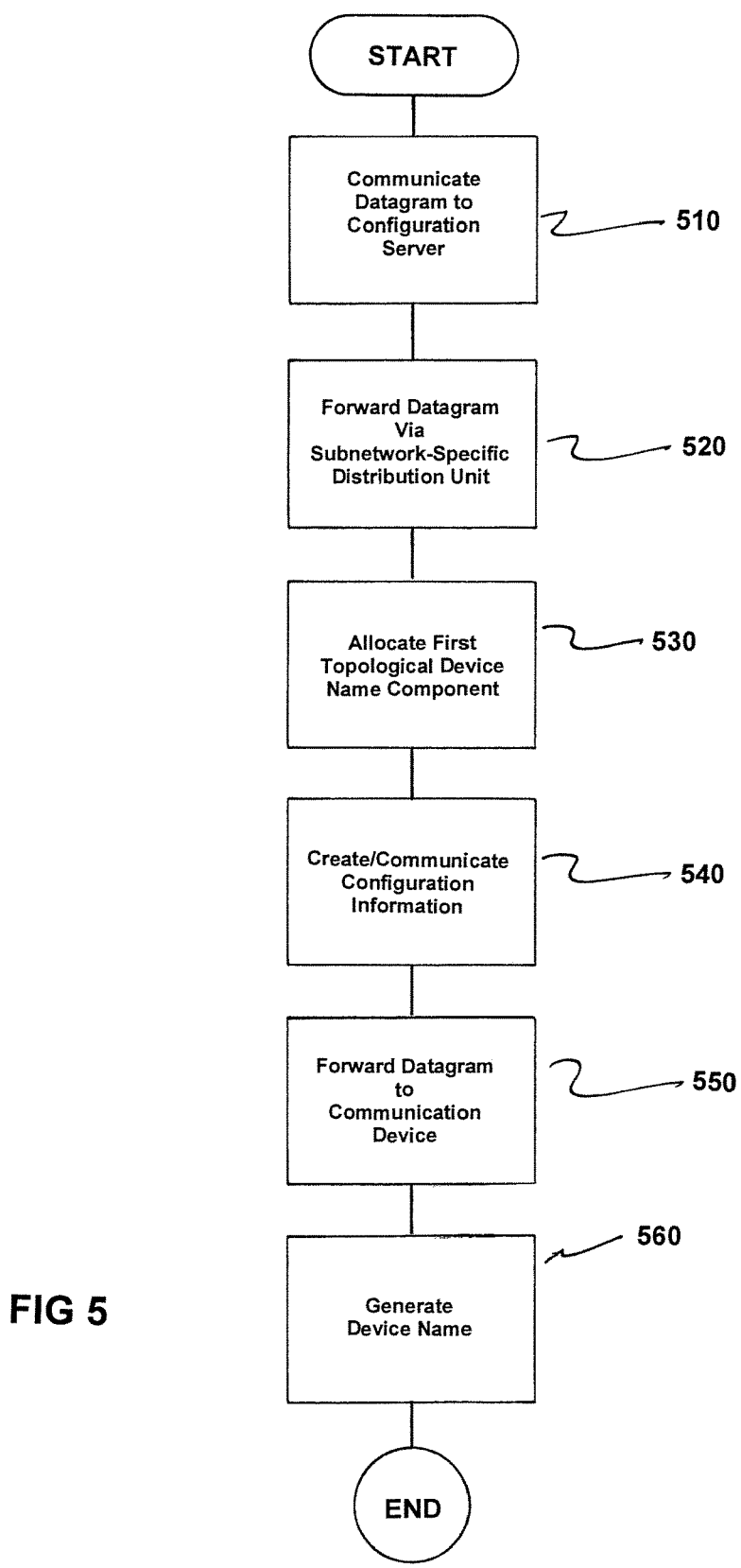
FIG. 5 is a flowchart of the method in accordance with the invention.

FIG. 5 is a flowchart of method for configuring a communication device within an industrial automation system. The method comprises communicating from a configuration unit of the communication device a datagram with a configuration request to a configuration server upon start-up of the communication device, as indicated in step 510.

Next, the datagram with the configuration request is forwarded to the configuration server when communicated via at least one subnetwork-specific distribution unit, as indicated in step 520.

At least one first topological device name component assigned to a spatial or hierarchical arrangement of the configuration server is now allocated to the communication device by the configuration server in response to the configuration request, as indcted in step 530. Here, each forwarding distribution unit adds a further topological device name component assigned to a spatial or hierarchical arrangement of a respective forwarding distribution unit.

The configuration server then creates configuration information comprising at least a first topological device name component and a datagram with the configuration information is also communicated to the communication device, as indicated in step 540.

Next, the datagram with the configuration information is forwarded to the communication device when communicated via the at least one subnetwork-specific distribution unit, as indicated in step 550.

A device name thereof from the topological device name components and a name component that is unique within the subnetwork of said device is now generated by the configuration unit of the communication device, as indicated in step 560.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for configuring a communication device within an industrial automation system, comprising:
    communicating from a configuration unit of the communication device a datagram with a configuration request to a configuration server upon start-up of the communication device;
    forwarding the datagram with the configuration request to the configuration server when communicated via at least one subnetwork-specific distribution unit;
    allocating to the communication device at least one first topological device name component assigned to a spatial or hierarchical arrangement of the configuration server by the configuration server in response to the configuration request, each forwarding distribution unit adding a further topological device name component assigned to a spatial or hierarchical arrangement of a respective forwarding distribution unit;
    creating, by the configuration server, configuration information comprising at least a first topological device name component and communicating a datagram with the configuration information to the communication device;
    forwarding the datagram with the configuration information to the communication device when communicated via the at least one subnetwork specific distribution unit;
    generating, by the configuration unit of the communication device, a device name thereof from the topological device name components and a name component that is unique within the subnetwork of said device.

2. The method as claimed in claim 1, wherein the configuration request is supplemented by the respective further topological device name component when communicated to the configuration server by each forwarding distribution unit.

3. The method as claimed in claim 2, wherein the configuration server allocates all topological device name components to the communication device; and wherein the configuration information created by the configuration server comprises all topological device name components.

4. The method as claimed in claim 1, wherein the configuration information is supplemented by the respective further topological device name component when communicated to the communication device by each forwarding distribution unit.

5. The method as claimed in claim 4, wherein the configuration server allocates only one first topological device name component to the communication device.

6. The method as claimed in claim 1, wherein the configuration server electronically signs the configuration information with an electronic key assigned to the configuration server.

7. The method as claimed in claim 1, wherein the configuration unit communicates the datagram with the configuration request as a multicast message.

8. The method as claimed in claim 1, wherein the configuration server is a DHCPv6 server; and wherein the at least one subnetwork-specific distribution unit is a DHCPv6 relay.

9. The method as claimed in claim 8, wherein the configuration server is assigned to a plurality of subnetworks; wherein the configuration unit communicates the datagram with the configuration request as a multicast message to a distribution unit within the subnetwork of the communication device; and wherein the distribution unit assigned to the subnetwork of the communication device forwards the datagram with the configuration request as a unicast message to the configuration server.

10. The method as claimed in claim 1, wherein the configuration request of the communication device comprises an option by which an allocation of a device name with at least one of (i) at least one topological or (ii) at least one hierarchical device name component is requested.

11. The method as claimed in claim 10, wherein at least one of (i) the configuration server or (ii) each forwarding distribution unit adds to the datagram with the configuration information for the communication device in each case a manufacturer-specific option which designates a spatial or hierarchical arrangement of at least one of (i) the configuration server and (ii) the respective forwarding distribution unit.

12. The method as claimed in claim 10, wherein the option is a manufacturer-specific option.

13. A distribution unit for a configuration server of an industrial communication network, the distribution unit comprising:
    a processor; and
    memory;
    wherein the distribution unit forwards datagrams with a respective configuration request of a communication device to the configuration server which creates configuration information comprising at least a first topological device name component and communicating a datagram with the configuration information to the communication device and generates a device name of a communication device from topological device name components and a name component that is unique within a subnetwork of said communication device;
    wherein the distribution unit additionally forwards datagrams with respective configuration information of the configuration server to a respective communication device; and
    wherein the distribution unit supplements the configuration information by the topological device name component assigned to a spatial or hierarchical arrangement of the distribution unit.

14. The distribution unit as claimed in claim 13, wherein the distribution unit is integrated as a DHCPv6 relay into a router that connects two subnetworks to one another.

15. The distribution unit as claimed in claim 13, wherein the distribution unit is integrated as a DHCPv6 lightweight relay into a switch; and wherein the distribution unit is further configured such that datagrams with configuration requests are processed before a switch operation by the DHCPv6 lightweight relay.

* * * * *